L. E. BURDIN.
LAP LINKS.

No. 192,972. Patented July 10, 1877.

Witnesses:
Henry N. Miller
John Schroeder

Inventor,
Luther E. Burdin
Alexander Mason
atty

UNITED STATES PATENT OFFICE.

LUTHER E. BURDIN, OF PARIS, KENTUCKY.

IMPROVEMENT IN LAP-LINKS.

Specification forming part of Letters Patent No. 192,972, dated July 10, 1877; application filed May 17, 1877.

*To all whom it may concern:*

Be it known that I, LUTHER E. BURDIN, of Paris, in the county of Bourbon, and in the State of Kentucky, have invented certain new and useful Improvements in Lap-Links; and do hereby declare that the following is a full, clear, and exact description thereof, reference being had to the accompanying drawings, and to the letters of reference marked thereon, making a part of this specification.

The nature of my invention consists in the construction and arrangement of a lap or broken link for joining sections of chain and such articles, the peculiarities of which will be hereinafter more particularly described.

To enable those skilled in the art to make and use my invention, I will proceed to describe its construction and operation.

Figure 1:
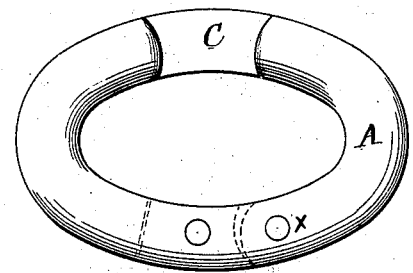
Figure 2:
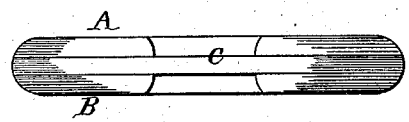

In the accompanying drawings, making part of this specification, Figure 1 represents a plan view; Fig. 2, an edge view; and Fig. 3, a view with one portion of the link removed.

Figure 3:
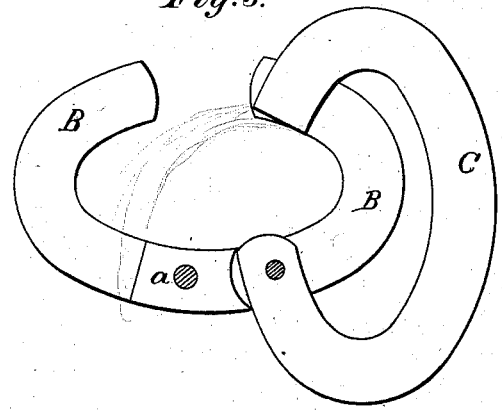

In the figures, A, B, and C represent broken links, made of metal and of any suitable size. The two links A and B are formed with their inner faces flat and their outer faces oval or half-round. Between these two links is placed a metal block, a, and a rivet fastens the three firmly together. The space left between the links A and B is sufficient to allow the link C to lie within it. This link C is formed with two flat faces, and is pivoted near one end between the links A and B, so that when it is turned upon its pivot it discloses the opening in the other two links, as seen in Fig. 3.

After the link which is to be connected to this broken link has been caught in the parts A and B, the link C is closed up, and thus a firm and safe connection is formed.

Having thus fully described my invention, what I claim as new, and desire to secure by Letters Patent, is—

The combination of the open links A and B, connected by a central block, a, riveted between them, and the link C, open on the reverse side, pivoted between the links A B, all constructed substantially as and for the purposes herein set forth.

In testimony that I claim the foregoing I have hereunto set my hand this 30th day of April, 1877.

LUTHER E. BURDIN.

Witnesses:
R. M. KENNEY,
S. M. RICHARDSON.